US012606375B2

(12) United States Patent
Jeon et al.

(10) Patent No.: US 12,606,375 B2
(45) Date of Patent: Apr. 21, 2026

(54) PARTS DELIVERY SYSTEM AND METHOD FOR OPERATING SAME

(71) Applicants: HYUNDAI MOTOR COMPANY, Seoul (KR); KIA CORPORATION, Seoul (KR)

(72) Inventors: Hyun Chul Jeon, Ulsan (KR); Hyo Geun Lee, Ulsan (KR); Jun Sik Kim, Ulsan (KR); Ho Ryul Kim, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 931 days.

(21) Appl. No.: 17/878,587

(22) Filed: Aug. 1, 2022

(65) Prior Publication Data

US 2023/0174306 A1 Jun. 8, 2023

(30) Foreign Application Priority Data

Dec. 2, 2021 (KR) ........................ 10-2021-0171029

(51) Int. Cl.
*G06F 7/00* (2006.01)
*B65G 1/137* (2006.01)

(52) U.S. Cl.
CPC ................................. *B65G 1/1375* (2013.01)

(58) Field of Classification Search
CPC ........ B65G 1/1375; B65G 1/137; B65G 1/04; B65G 1/1373; B65G 1/0492; B65G 1/00; B65G 65/00; B65G 35/00; B65G 37/00; B65G 1/02; B65G 1/0407; B65G 1/0414; B65G 1/0421; B65G 1/0428; B65G 1/0435; B65G 1/0485; B65G 1/06; B65G 1/1371; B65G 1/1376; B65G 1/1378; B65G 2201/00; B65G 2201/02; B65G 2209/00; B65G 2209/02; B65G 2209/06; B65G 2209/10; B23P 19/001; B23P 21/00;

(Continued)

(56) References Cited

U.S. PATENT DOCUMENTS 10,169,729 B2 * 1/2019 Bell ..................... G05D 1/0011
2019/0377334 A1 * 12/2019 Nakamura ............. G06Q 10/06

FOREIGN PATENT DOCUMENTS

CN          112101620 A  * 12/2020    ....... G06Q 10/08355
CN          112288376 A  *  1/2021    ....... G06Q 10/08355

(Continued)

*Primary Examiner* — Yolanda R Cumbess
(74) *Attorney, Agent, or Firm* — MCDONNELL BOEHNEN HULBERT & BERGHOFF LLP

(57) ABSTRACT

Disclosed are a parts delivery system and a method of operating the same. The parts delivery system includes a production line configured to receive parts and assemble a finished product, a parts loading site configured to have a space where the parts are loaded; a parts transportation unit configured to load the parts in the parts loading site or discharge the parts from the parts loading site to supply the parts to the production line, and a processor configured to provide virtual space data on the parts loading site, to establish a parts loading schedule and a parts discharging schedule on the virtual space data according to an assembly schedule of the finished product of the production line, and to control the parts transportation unit to load or discharge the parts in the actual parts loading site according to the parts loading schedule and the parts discharging schedule.

8 Claims, 7 Drawing Sheets

(58) Field of Classification Search
CPC .......... B23P 19/04–041; B23P 2700/50; B23P
2700/01; B23P 2700/14; G06Q 10/08;
G06Q 10/087; G06Q 10/06313–06316;
G06Q 10/0633; G06Q 10/04; G06Q
10/06; G06Q 10/0631; G06Q 10/06311;
G06Q 10/06312–06316; G06Q 10/06334;
G06Q 10/0843; G06Q 10/0872; G06Q
10/08724; G06Q 10/08726; G06Q
10/0874; G06Q 10/08741; G06Q
10/08743; G06Q 10/08744; Y02P 90/60;
G05D 2201/0216
USPC ......... 700/213–214, 213–218, 226, 229–230
See application file for complete search history.

(56) References Cited

FOREIGN PATENT DOCUMENTS

| | | | | |
|----|----------------|---|---|--------|
| JP | H10214293 | A | * | 8/1998 |
| KR | 20140051556 | A | | 5/2014 |

* cited by examiner

PARTS DELIVERY SYSTEM AND METHOD FOR OPERATING SAME

CROSS-REFERENCE TO RELATED APPLICATION

This application is based on and claims priority under 35 U.S.C. 119 to Korean Patent Application No. 10-2021-0171029, filed on Dec. 2, 2021, in the Korean Intellectual Property Office, the disclosure of which is herein incorporated by reference in its entirety.

BACKGROUND

1. Field

The disclosure relates to a parts delivery system and a method for operating the same and, more specifically, to a parts delivery system and a method for operating the same, wherein information is transmitted/received between a manufacturing execution system (MES) and a control system for controlling logistics equipment including an autonomous mobile robot (AMR) such that parts and/or processed goods are automatically loaded and discharged; even if there is no automatic warehouse facility that occupies a specific space in a parts loading site where parts or the like are loaded, production flexibility is secured by variably using the empty space, and the productivity is improved by automating loading and discharging of parts and the like.

2. Description of the Related Art

An automated storage and retrieval system (ASRS) refers to a system used to store (load) parts necessary to produce a finished product from a storage position to another storage position and searching and picking the stored parts, and is characterized in that parts are accurately stored and removed in a predetermined position, with no human intervention in an operation of transporting parts to a specific processing or interface point.

As a parts delivery operating method for loading or discharging parts necessary for respective processes and supplying the parts for respective processes during a finished product production process in a parts loading site having no ASRS described above, a conventional operating method is as follows: operators have the discretion to arbitrarily distinguish places to load and discharge loaded parts by using manned forklifts or the like according to the type of the finished product, and manually load and discharge the same. If parts are manually supplied to a specific plate at their discretion, the operators may overspeed, neglect to watch forwards carefully, or generate other safety hazards. In addition, a failure to update information regarding the space in which operators have arbitrarily loaded and discharged parts may result in excessive billing of specific parts or omission thereof. This may degrade the productivity of the finished product.

The above have been made only to help in understanding of the background of the disclosure, correspond to technical information which has been held by inventors to derive embodiments of the disclosure, or which has been acquired in the process of deriving the same, and are not to be deemed by those skilled in the art or general public to correspond to already-known prior arts prior to application.

SUMMARY

The present disclosure is proposed to solve the above-mentioned problems, and it is an aspect of the disclosure to provide a parts delivery system and a method for operating the same, wherein information is transmitted/received between a manufacturing execution system (MES) and a control system for controlling logistics equipment including an autonomous mobile robot (AMR) such that parts and/or processed goods are automatically loaded and discharged; even if there is no automatic warehouse facility that occupies a specific space in a parts loading site where parts or the like are loaded, production flexibility is secured by variably using the empty space, and the productivity is improved by automating loading and discharging of the parts and the like.

The above-mentioned technical aspects are not limiting in any manner, and other technical aspects may be derived from the following description.

In accordance with an aspect of the disclosure, a parts delivery system includes a production line configured to receive parts and assemble a finished product, a parts loading site configured to have a space where the parts are loaded, a parts transportation unit configured to load the parts into the parts loading site, or discharge the parts from the parts loading site to a designated assembly point on the production line, such that the parts are automatically supplied to the production line for assembly.

The parts transportation unit may be any one of an automated guided vehicle (AGV) that is guided and driven by an electronic device disposed on a driving path from a predetermined starting point to the parts loading site, or an autonomous mobile robot (AMR) that calculates the driving path autonomously.

The starting point may be a loading point where parts to be loaded in the parts loading site are loaded by the parts transportation unit, and the parts deliver system may further include a location sensor configured to detect whether the parts arrive at the starting point, and the processor may control the parts transportation unit to load the parts based on a detection result of the location sensor.

The virtual space data on the parts loading site may include a loading space where parts to be loaded are already loaded and an empty space where the parts to be loaded are not yet loaded.

The virtual space data on the parts loading site may include a loading row space where parts to be loaded are already loaded among loading rows in which the parts to be loaded necessary for each model of a finished production are loaded, and an empty space where the parts to be loaded are not yet loaded.

When there are a plurality of loading rows loaded with the parts to be loaded required for the same model, the processor may control the parts transportation unit to load the parts on a last loading row of the same model.

When there are a plurality of loading rows loaded with the parts to be loaded required for the same model, the processor may control the parts transportation unit to discharge the parts from the loading row where a loading time of the parts loaded on the loading row furthest from an entrance of the parts loading site is longer among the plurality of loading rows.

The parts transportation unit may include a loading sensor configured to detect a loading state in which the parts to be loaded in the parts loading site are loaded or an unloading state in which the parts loaded in the parts loading site are unloaded, and the processor may update virtual space data on the parts loading site based on a detection result of the loading sensor.

In accordance with another aspect of the disclosure, a method of operating a parts delivery system by a processor controlling a parts transportation unit, in which parts required for each process in a process of producing a finished product are loaded or discharged into or from a parts loading site and the parts are supplied to each process includes generating, by the processor, a finished product assembly schedule in which parts required for each time in each process of producing the finished product are scheduled, generating, by the processor, virtual space data on a loading space where parts to be loaded are already loaded and an empty space where the parts to be loaded are not yet loaded from a parts loading site based on predetermined loading space data and loading logistics data, and generating, by the processor, a parts loading schedule in which parts to be loaded for each time according to the finished product assembly schedule are scheduled based on the virtual space data and then controlling the parts transportation unit.

The method may further include, after the controlling the parts transportation unit, generating, by the processor, a parts discharging schedule in which the parts, loaded according to the parts loading schedule, to be discharged are scheduled and then controlling the parts transportation unit.

The controlling the parts transportation unit may include controlling, when there are a plurality of loading rows loaded with the parts to be loaded required for the same model, the parts transportation unit to load the parts on a last loading row of the same model.

The controlling the parts transportation unit may include controlling, when there are a plurality of loading rows loaded with the parts to be loaded required for the same model, the parts transportation unit to discharge the parts from the loading row where a loading time of the parts loaded on the loading row furthest from an entrance of the parts loading site is longer among the plurality of loading rows.

The method may further include, after the controlling the parts transportation unit, generating a parts discharging schedule in which the parts, loaded according to the parts loading schedule, to be discharged are scheduled and then controlling the parts transportation unit.

The method may further include updating the virtual space data on the parts loading site based on a detection result of a loading sensor configured to detect a loading state in which the parts to be loaded in the parts loading site are loaded or an unloading state in which the parts loaded in the parts loading site are unloaded.

In accordance with another aspect, an embodiment of the disclosure may provide a recording medium which can be read by at least one computer, storing a program enabling the above method to be performed.

A parts delivery system and a method for operating the same according to the disclosure are advantageous in that information is transmitted/received between a manufacturing execution system (MES) and a control system for controlling logistics equipment including an autonomous mobile robot (AMR) such that parts and/or processed goods are automatically loaded and discharged; even if there is no automatic warehouse facility that occupies a specific space in a parts loading site where parts or the like are loaded, production flexibility is secured by variably using the empty space; and the productivity is improved by automating loading and discharging of the parts and the like.

Advantageous effects described above are not limiting in any manner, and other advantageous effects may be derived from the following description.

BRIEF DESCRIPTION OF THE DRAWINGS

The above and other aspects, features and advantages of the disclosure will be more apparent from the following detailed description taken in conjunction with the accompanying drawings, in which.

DETAILED DESCRIPTION

Figure 1:
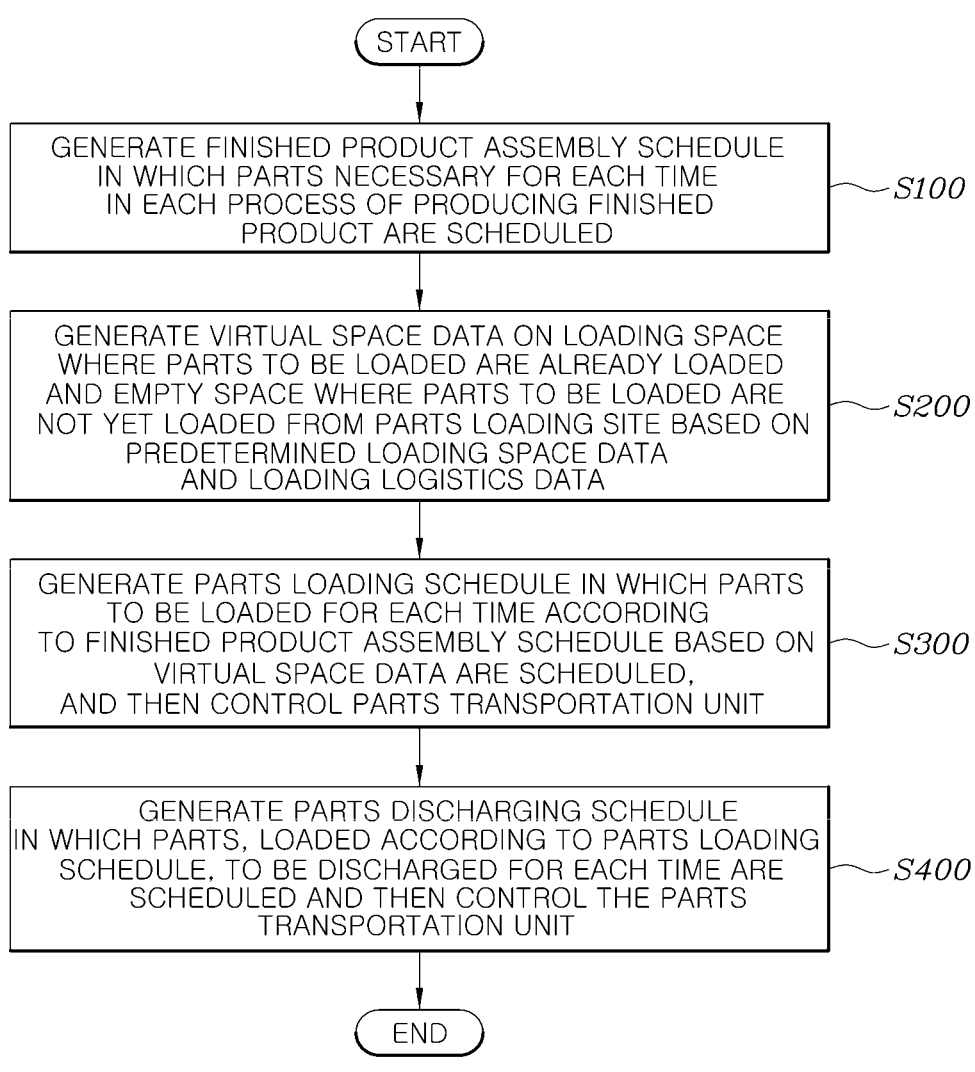
FIG. 1 is a flowchart illustrating a method of operating a parts delivery system according to an embodiment of the disclosure.

A specific structural or functional description of embodiments of the present disclosure set forth in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

To clearly describe the present disclosure, parts not associated with the description are omitted, and throughout the specification, the same or like reference numerals designate the same or like elements. Further, A singular expression may include a plural expression unless they are definitely different in a context.

In the following detailed description, such terms as "a first" and/or "a second" used for names of elements are intended to distinguish between elements having the same configuration, and the elements are not necessarily limited by the order thereof in the following description. For example, a first element may be named a second element and similarly a second element may be named a second element without departing from the scope of protection of the present disclosure.

Throughout the specification, when a part is referred to as "including" or "having" an element, this expression means that the corresponding part does not exclude other elements and may further include any other element unless specially mentioned otherwise. That is, in the specification, the expression "include" or "have" are intended to specify the existence of mentioned features, regions, numbers, steps, operations, elements, components, or combinations thereof, and should be construed as not precluding the possible existence or addition of one or more other features, regions, numbers, steps, operations, elements, components, or combination groups thereof.

Further, in describing embodiments set forth in the specification, a detailed description of known relevant technologies will be omitted when it is determined that the description may make the subject matter of the present disclosure obscure.

Finally, unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, embodiments of the present disclosure will be described in detail with reference to the accompanying drawings.

Figure 2:
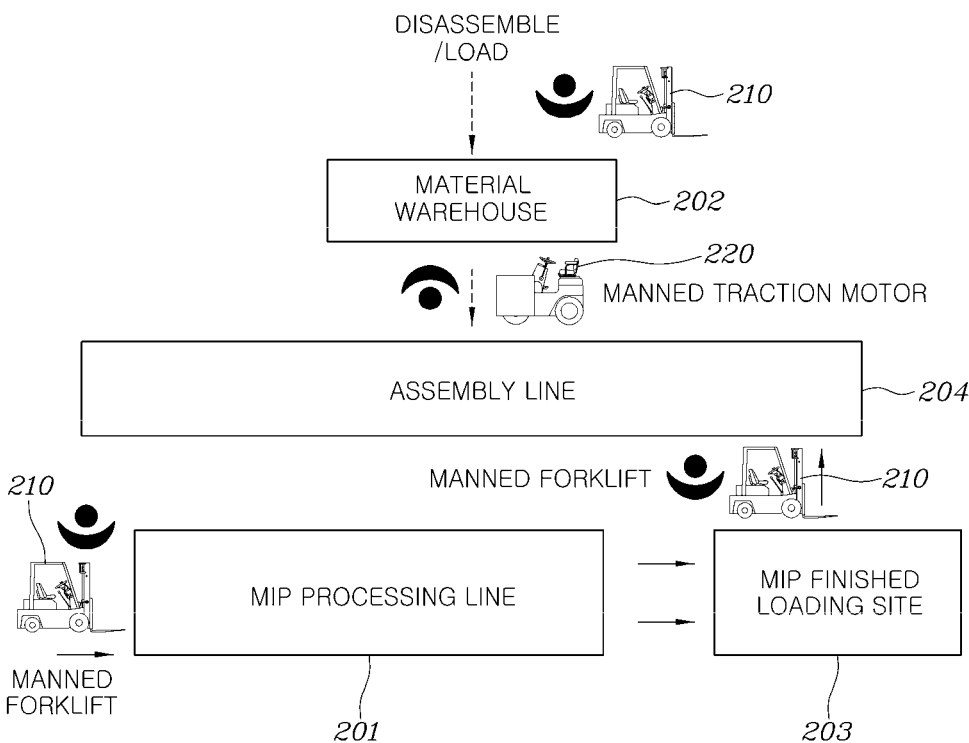
FIG. 2 is a diagram illustrating a parts delivery system according to the prior art.
Figure 3:
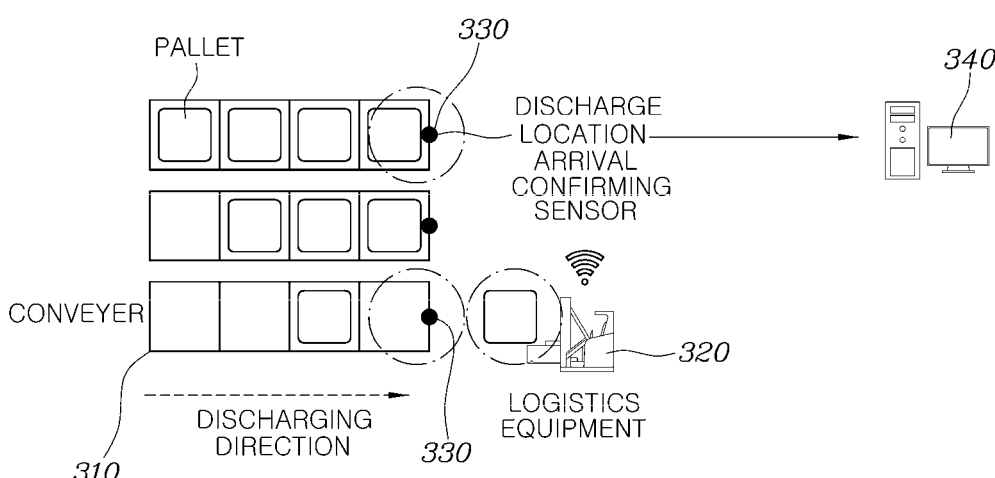
FIG. 3 is a diagram illustrating a portion of a parts delivery system according to an embodiment of the disclosure.
Figure 4:
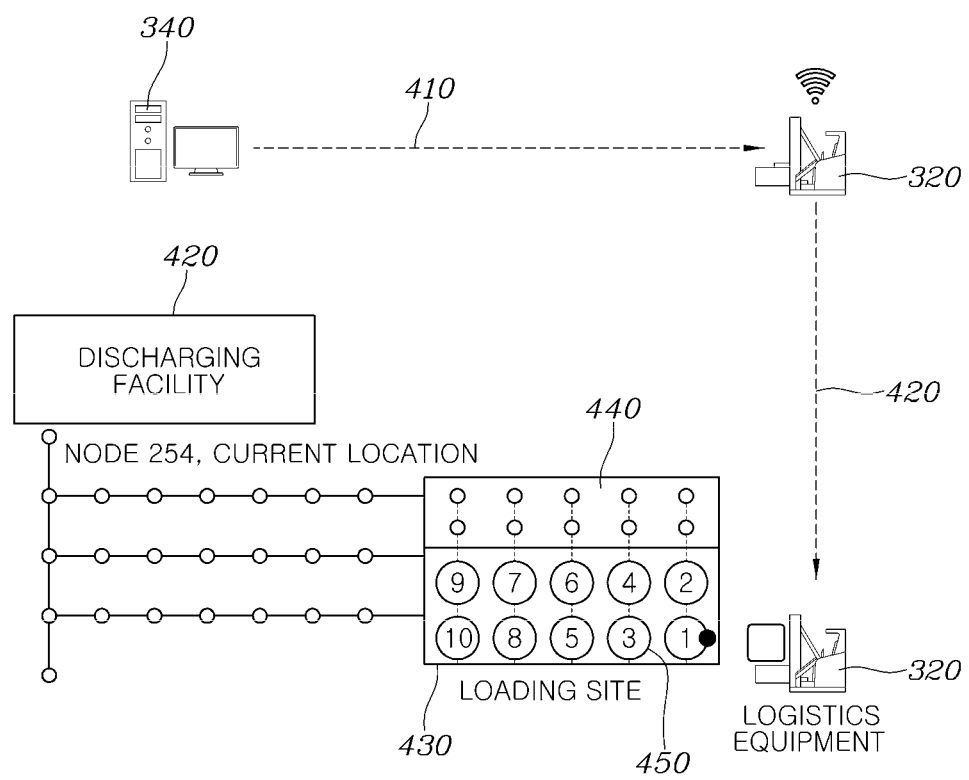
FIG. 4 is a diagram illustrating another portion of a parts delivery system according to an embodiment of the disclosure.
Figure 5:
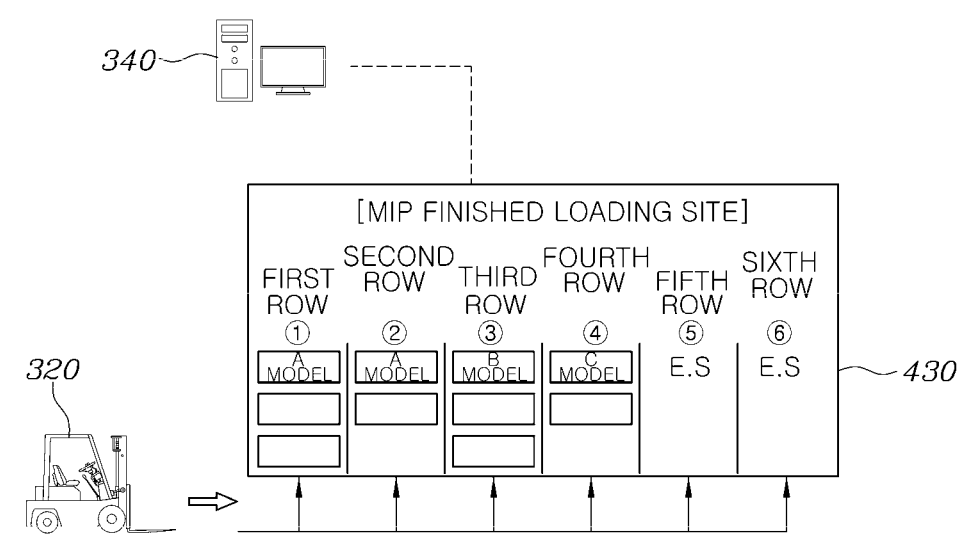
FIG. 5 is a diagram illustrating another step of a method of operating a parts delivery system according to an embodiment of the disclosure.
Figure 5:
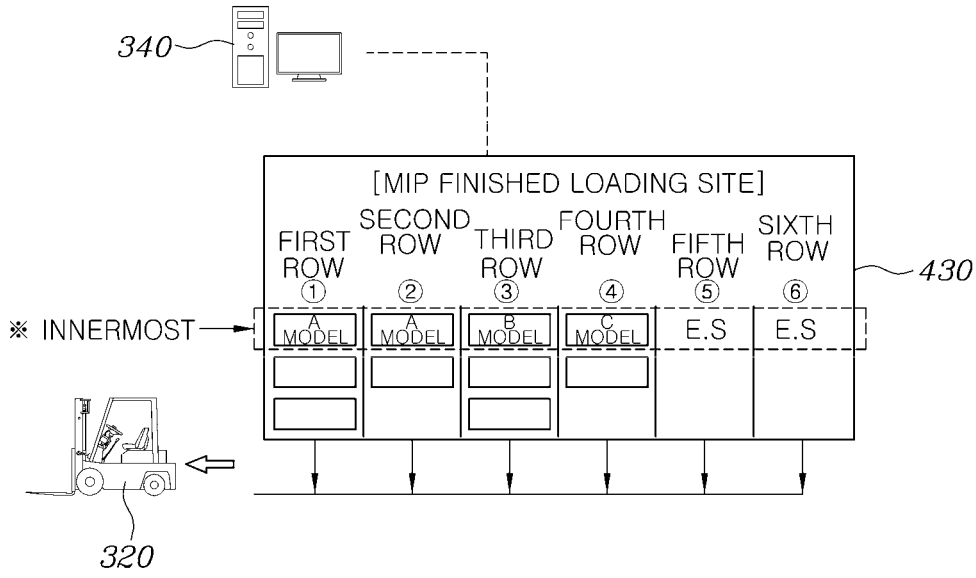
Figure 6:
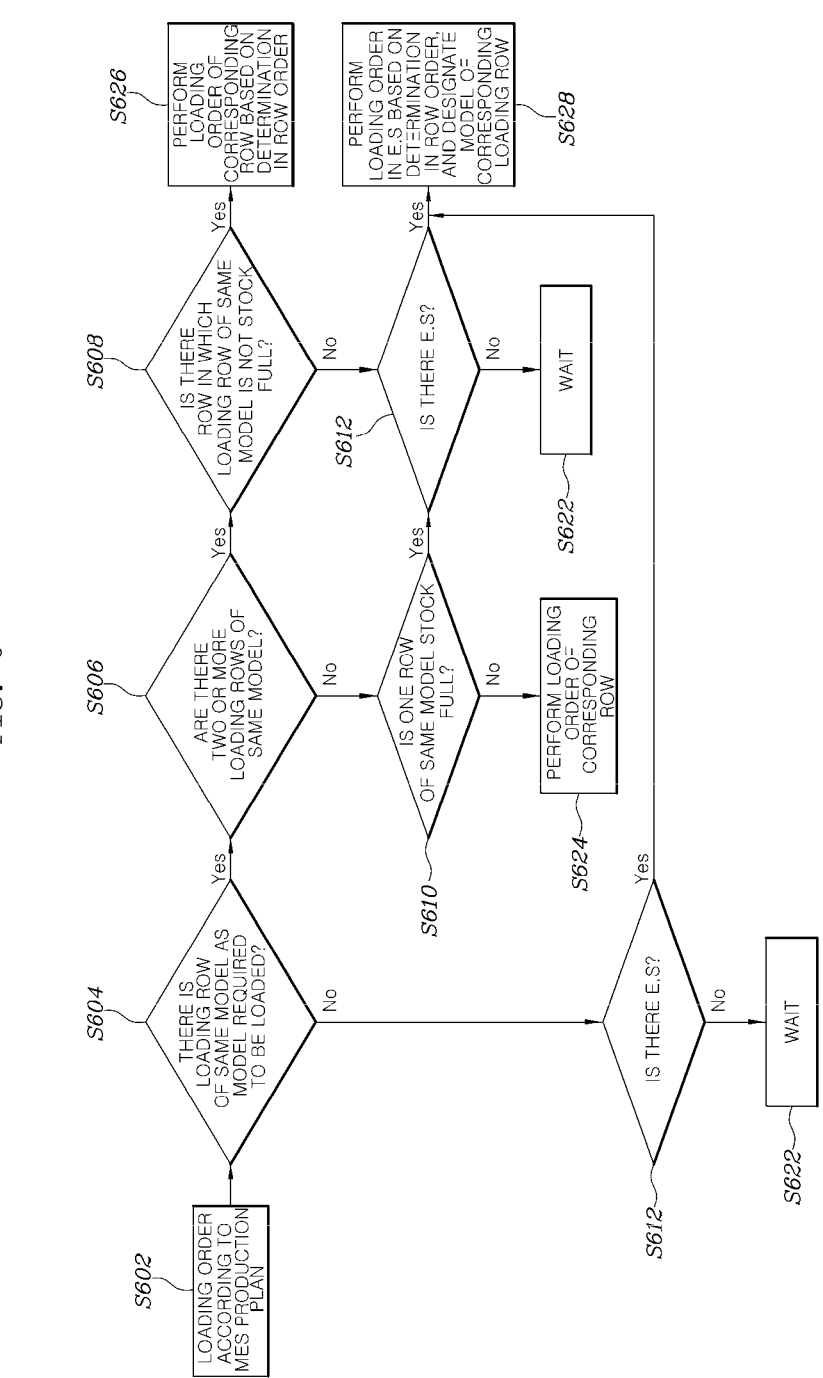
FIG. 6 is a flowchart illustrating a method of operating a parts delivery system according to another embodiment of the disclosure.
Figure 7:
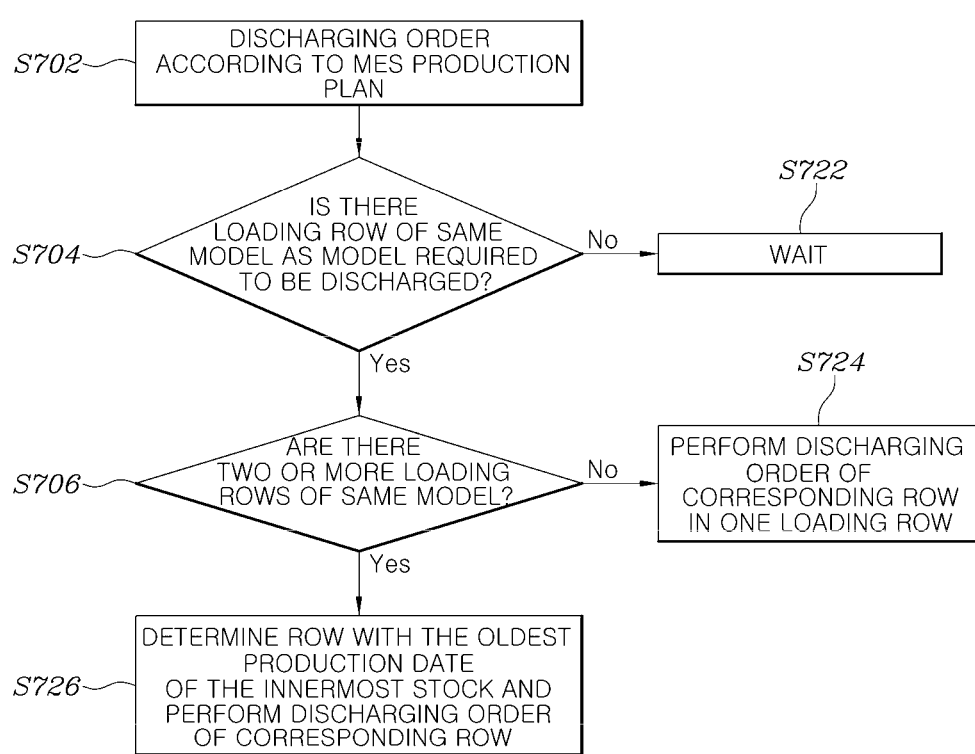
FIG. 7 is a flowchart illustrating a method of operating a parts delivery system according to still another embodiment of the disclosure.

FIG. 1 is a flowchart illustrating a method of operating a parts delivery system according to an embodiment of the disclosure, FIG. 2 is a diagram illustrating a parts delivery system according to the prior art, FIG. 3 is a diagram illustrating a portion of a parts delivery system according to an embodiment of the disclosure, FIG. 4 is a diagram illustrating another portion of a parts delivery system according to an embodiment of the disclosure, FIG. 5 is a diagram illustrating another step of a method of operating a parts delivery system according to an embodiment of the disclosure, FIG. 6 is a flowchart illustrating a method of operating a parts delivery system according to another embodiment of the disclosure, and FIG. 7 is a flowchart illustrating a method of operating a parts delivery system according to still another embodiment of the disclosure.

FIG. 2 is a diagram illustrating a parts delivery system according to the prior art. Here, the parts include parts of made in plant (MIP) produced in a factory that manufactures materials and finished products, parts of local part (LP: outsourced production parts), and/or parts of knock down (KD: imported production parts). The finished product is exemplified as a vehicle, but is not limited thereto.

As illustrated in FIG. 2, the parts delivery system of the prior art was a system in which a worker loads and discharges parts necessary for the finished product under the worker's autonomous determination. In particular, in the case of the parts of MIP that are processed and produced in a factory that manufactures finished products, the worker manually transports the parts of MIP to an MIP processing line 201 using a manned forklift 210, and the processed parts of MIP are transported to an MIP finished loading site 203 through a conveyor belt or the like.

In addition, materials for assembling the finished product are disassembled (an operation of dismantling the individual packaging of the parts loaded in a box, and arranging and loading the parts in another box) and loaded, and are transported to a material warehouse 202 by a worker using the manned forklift 210. The parts loaded in the MIP finished loading site 203 or the material warehouse 202 are loaded by a manned traction motor 220 or the manned forklift 210, and are unloaded to the assembly line of the finished product. In such a parts delivery system, the manned forklift 210 and/or the manned traction motor 220 as a logistic equipment transmits and receives logistics information about how many parts for any finished product model should be loaded and unloaded in how many pallet stages in a server from a certain departure point to a certain arrival point according to a determined production schedule, and the worker checks the logistics information and manually performs parts logistics.

Accordingly, in the parts delivery system of the prior art, a space existing in the material warehouse 202 or the MIP finished loading site 203 as a place where the worker loads and discharges the parts using the logistics equipment such as the manned forklift under the worker's autonomous determination was arbitrarily divided and the parts are manually loaded and discharged. In this way, as the worker manually supplies the parts to a specific place under arbitrary determination, a safety accident occurs due to the worker's overspeed operation of the logistics equipment or the negligence of the forward-looking duty. In addition, since information about the space where the worker arbitrarily loads and discharges the parts is not updated on the server, certain parts may be overcharged or undercharged and omitted. Therefore, the productivity of the finished product in the parts delivery system of the prior art is inhibited by that much.

Therefore, a parts delivery system according to an embodiment of the disclosure includes a production line configured to receive parts and assemble a finished product; a parts loading site configured to have a space where the parts are loaded; a parts transportation unit configured to load the parts in the parts loading site or discharge the parts from the parts loading site to supply the parts to the production line; and a processor configured to provide virtual space data on the parts loading site, to establish a parts loading schedule and a parts discharging schedule on the virtual space data according to an assembly schedule of the finished product of the production line, and to control the parts transportation unit to load or discharge the parts in the actual parts loading site according to the parts loading schedule and the parts discharging schedule.

That is, in the parts delivery system according to an embodiment of the disclosure, the processor controls the parts transportation unit, not the worker, to perform loading or discharging of the parts according to the parts loading schedule and the parts discharging schedule. To this end, the parts delivery system according to an embodiment of the disclosure is provided with the virtual space data synchronized with the actual parts loading site. Through this, the parts delivery system according to an embodiment of the disclosure may automatically supply the parts required for each process to be passed in a process of producing the finished product, in a timely manner. In addition, the parts delivery system according to an embodiment of the disclosure may manage the inventory of the parts necessary for the finished product in real time by adding/deleting/updating the virtual space data.

FIG. 1 is a flowchart illustrating a method of operating a parts delivery system according to an embodiment of the disclosure. The method of operating the parts delivery system according to an embodiment of the disclosure is a method in which a processor operates, by controlling a parts transportation unit, a parts delivery system for loading or discharging parts required for each process in a parts loading site during the production process of a finished product, to supply the required parts to each corresponding production step. The method of operating the parts delivery system according to an embodiment of the disclosure includes generating (S100), by a processor, a finished product assembly schedule in which parts required for each time in each process of producing a finished product are scheduled, generating (S200), by the processor, virtual space data on a loading space where parts to be loaded are already loaded and an empty space where the parts to be loaded are not yet loaded from a parts loading site based on predetermined loading space data and loading logistics data, and generating (S300), by the processor, a parts loading schedule in which parts to be loaded for each time according to the finished product assembly schedule are scheduled based on the virtual space data and then controlling a parts transportation unit.

In other words, by separately classifying the data on the loading space and the empty space as the virtual space data, and generating the parts loading schedule and then controlling the parts transportation unit, the method of operating the parts delivery system according to an embodiment of the disclosure may add/delete/update current space data, loading space data, and an empty space data consumed by loading the parts.

The method of operating the parts delivery system according to another embodiment of the disclosure may further include, after the controlling the parts transportation unit, generating (S400), by the processor, a parts discharging schedule in which the parts, loaded according to the parts loading schedule, to be discharged are scheduled and then controlling the parts transportation unit. The method of operating the parts delivery system according to another embodiment of the disclosure may add/delete/update space data after loading the parts, loading space data, and an empty space data obtained by discharging the parts.

FIG. 3 is a diagram illustrating a portion of a parts delivery system according to an embodiment of the disclosure. The parts transportation unit 320 may be an automated guided vehicle (AGV) that is guided along a path by electronic devices placed along the path, or an autonomous mobile robot (AMR) that calculates its own driving path. The starting point is defined as the loading point at the parts loading site where the parts are to be loaded by the parts transportation unit 320. The parts delivery system may include a location sensor 330 to detect whether the parts have reached the starting point. The processor controls the parts transportation unit 320 to load the parts based on the detection results of the location sensor 330.

As illustrated in FIG. 3, MIP finished parts may be placed on a pallet and transported to a conveyor belt. A server 340 receives detection results from the location sensor to determine whether the MIP finished parts have reached the loading point of the parts loading site. The processor controls the server 340 to transmit information about the detected parts—based on the detection results or the finished product assembly schedule—to the parts transportation unit 320. The parts transportation unit 320 receives this information and is controlled to automatically approach the corresponding location in the parts loading site and load the MIP finished parts as instructed.

FIG. 4 is a diagram illustrating another portion of a parts delivery system according to an embodiment of the disclosure. Virtual space data on a parts loading site in a parts delivery system according to an embodiment of the disclosure may include virtual space data representing the parts loading site, including a loading space 440 where parts have already been loaded and an empty space 450 where parts have not yet been loaded, synchronized with the actual physical layout of the parts loading site. The processor controls the server to instruct the parts transportation unit 320 to follow a guided path from a predetermined starting point of a parts discharging facility 420 to the parts loading site 430, or to calculate the path autonomously and transport the loaded parts to the parts loading site 430. More specifically, the processor transmits an unloading signal 410 to the parts transportation unit 320 to cause it to unload the parts from Node 254 of the parts discharging facility 420, the predetermined starting point, to a first point of an empty space 450 in the parts loading site 430, where the empty space has been determined by the processor to receive the loaded parts.

FIG. 5 is a diagram illustrating another step of a method of operating a parts delivery system according to an embodiment of the disclosure. In the parts delivery system according to an embodiment of the disclosure, virtual space data on the parts loading site may include virtual space data including a loading row space 430, representing rows in which parts required for each model of the finished product have already been loaded, and an empty row space (E.S) 430 representing rows where parts have not yet been loaded.

As illustrated in FIG. 5, the processor controlling the server 340 may, when multiple loading rows contain parts required for the same model, instruct the parts transportation unit 320 to load additional parts onto the loading row with the greatest available empty space among those rows.

As illustrated in FIG. 5, in the parts delivery system according to another embodiment of the disclosure, the processor that controls the function of the server 340 may control, when there are a plurality of loading rows loaded with the parts to be loaded required for the same model (A model among A, B, or C models), the parts transportation unit 320 to discharge the parts from the loading row where the loading time of the parts loaded on the loading row furthest from the entrance of the parts loading site is longer among the plurality of loading rows. Therefore, the parts delivery system according to an embodiment of the disclosure May efficiently utilize the loading space and the empty space and may effectively manage an inventory space.

FIG. 6 is a flowchart illustrating a method of operating a parts delivery system according to another embodiment of the disclosure. In the method of operating the parts delivery system according to another embodiment of the disclosure may receive (S602) a loading order according to a production plan on a manufacturing execution system (MES), and may then determine (S604) whether there is a loading row of the parts of the same model as the parts of a finished product model that needs to be loaded.

As illustrated in FIG. 6, when there are a plurality of loading rows in which the parts to be loaded necessary for the same model are loaded (S606), the method of operating the parts delivery system according to another embodiment of the disclosure may control the parts transportation unit to load the parts on the loading row (S608) with more empty space among the plurality of loading rows (S626).

As illustrated in FIG. 6, when there is no loading row space in which the parts to be loaded are already loaded among the loading rows on which the parts to be loaded necessary for each model of the finished product are loaded (S610), the method of operating the parts delivery system according to another embodiment of the disclosure may control the parts transportation unit to load the parts on the empty space of the corresponding loading row space (S624). In addition, when there is the empty row space (E.S) in the empty row space (S612) where the parts are not yet loaded except for the loading row space (S610), the method may control the parts transportation unit to load the parts in the empty row space (S628). When there is no empty space or the empty row space (S612), the processor may execute instructions to control the parts transportation unit to wait (S622).

FIG. 7 is a flowchart illustrating a method of operating a parts delivery system according to still another embodiment of the disclosure. As illustrated in FIG. 7, the method of operating the parts delivery system according to still another embodiment may receive a loading order according to a production plan on an MES (S702), and may then determine whether there is a loading row of the same model parts as the parts of the finished product model that needs to be loaded (S704).

As illustrated in FIG. 7, when there are not a plurality of loading rows loaded with the parts to be loaded required for the same model (S706), the method of operating the parts delivery system according to still another embodiment may control the parts transportation unit to discharge the parts from the corresponding loading row (S724). When there are a plurality of loading rows (S706), the method may control the transportation unit to discharge the parts from the loading row where the loading time of the parts loaded on the loading row furthest from the entrance of the parts loading site is longer among the plurality of loading rows (S726). When there is no loading row for discharging the same model parts (S704), the processor may control the parts transportation unit to wait (S722).

As described above, according to the parts delivery system and the method of operating the parts delivery system according to the disclosure, by transmitting and receiving information between a manufacturing execution system (MES) and a control system for controlling a logistics equipment including an autonomous mobile robot (AMR), the parts and/or processed goods may be automatically loaded and discharged.

In addition, even if there is no automatic warehouse facility that occupies a specific space in a parts loading site where parts or the like are loaded, production flexibility may be secured by variably using the empty space.

In addition, the productivity may be improved by automating loading and discharging of the parts and the like.

A processor implementing the function, process and/or method described above may process data, generate a control signal, and provide the control signal while power is supplied. In addition, the processor may be included in a server. In addition, the processor may be configured as a processing circuitry for controlling the function of the server, and the server may include a processor, a transmitter, a receiver, and a memory.

The processor may be implemented using at least one of an application specific integrated circuit (ASIC), a digital signal processor (DSP), a programmable logic device (PLD), a field programmable gate arrays (FPGA), a controller, a microcontroller, a microprocessor, and an electrical unit for performing other functions.

In addition, the processor may store program codes and data, and may be electrically connected to a memory as a computer-readable recording medium to exchange signals. The memory may store data processed by the processor. Here, the memory may be configured as at least one of a ROM, a RAM, an EPROM, a flash drive, and a hard drive in terms of hardware. The memory may be implemented integrally with a program or may be classified as a sub-configuration of the processor.

As described above, the disclosure has been described mainly based on embodiments. Those of ordinary skill in the art to which the disclosure pertains will understand that the disclosure can be implemented in a modified form without departing from the essential characteristics of the disclosure.

In other words, since the embodiment according to the disclosure can have various changes and can have various forms, specific embodiments are illustrated in the drawings and described in detail in the present specification or application. However, this is not intended to limit the embodiment according to the concept of the disclosure to a specific disclosed form, it should be understood to include all modifications, equivalents, and substitutes included in the spirit and scope of the disclosure.

Therefore, the disclosed embodiments are to be considered in an illustrative rather than a restrictive sense. The scope of the disclosure is indicated in the claims rather than the foregoing description, and all differences within the scope equivalent thereto should be construed as being included in the disclosure.

What is claimed is:

1. A parts delivery system comprising:

a production line configured to receive parts and assemble a finished product;

a parts loading site configured to have a space where the parts are loaded;

a parts transportation unit configured to load the parts into the parts loading site and to discharge parts from the parts loading site, wherein the discharged parts are supplied to the production line; and a processor configured to; provide virtual space data representing the actual spaces of the parts loading site, establish parts loading and discharging schedules based on the virtual space data and the assembly schedule of the finished product, and control the parts transportation unit to load and discharge the parts to or from the actual parts loading site according to the established schedules.

2. The parts delivery system of claim 1, wherein the parts transportation unit is either:

an automated guided vehicle (AGV) guided and driven by an electronic device disposed on a driving path from a predetermined starting point, the starting point being a location at the parts loading site where parts have arrived; or an autonomous mobile robot (AMR) that calculates a driving path from a predetermined starting point autonomously, the starting point being a location at the parts loading site where parts have arrived.

3. The parts delivery system of claim 2, wherein the starting point is a loading point of the parts loading site where parts 20 are loaded by the parts transportation unit, the parts delivery system further comprises a location sensor configured to detect whether the parts have arrived at the starting point, and the processor controls the parts transportation unit to load the parts into the parts loading site based on a detection result of the location sensor.

4. The parts delivery system of claim 1, wherein virtual space data on the parts loading site includes a loading space representing areas where parts have already been loaded and an empty space representing areas where parts have not yet been loaded, both synchronized with the actual physical layout of the parts loading site.

5. The parts delivery system of claim 1, wherein virtual space data on the parts loading site includes a loading row space representing rows where parts required for each model of the finished product have already been loaded, and an empty row space representing rows where parts have not yet been loaded.

6. The parts delivery system of claim 1, wherein, when multiple loading rows contain parts required for the same model, the processor controls the parts transportation unit to load additional parts onto the last loading row among those rows.

7. The parts delivery system of claim 1, wherein, when multiple loading rows contain parts required for the same model, the processor controls the parts transportation unit to discharge parts from the loading row having the longest loading time among the rows furthest from the entrance of the parts loading site.

8. The parts delivery system of claim 1, wherein
the parts transportation unit includes a loading sensor
   configured to detect whether the unit is in a loading
   state, wherein the parts are in process of being loaded
   into the parts loading site, or an unloading state,
   wherein the parts are in process of being unloaded from
   the parts loading site, and the processor updates the
   virtual space data of the parts loading site based on a
   detection result of the loading sensor.

<p style="text-align:center">* * * * *</p>